(12) United States Patent
Lin et al.

(10) Patent No.: US 7,252,168 B2
(45) Date of Patent: Aug. 7, 2007

(54) MODULAR TYPE MOTOR-DRIVEN VEHICLE

(75) Inventors: Tsang-Mao Lin, Kaohsiung (TW); Jui-Tien Chen, Kaohsiung (TW)

(73) Assignee: Kwang Yang Motor Co., Ltd, Kaohsiung (TW)

( * ) Notice: Subject to any disclaimer, the term of this patent is extended or adjusted under 35 U.S.C. 154(b) by 364 days.

(21) Appl. No.: 11/077,875

(22) Filed: Mar. 10, 2005

(65) Prior Publication Data

US 2006/0201729 A1 Sep. 14, 2006

(51) Int. Cl.
*B62D 61/00* (2006.01)

(52) U.S. Cl. ............... 180/208; 180/908; 280/781
(58) Field of Classification Search ........... 180/208, 180/211, 214, 215, 216, 908; 280/781, 785
See application file for complete search history.

(56) References Cited

U.S. PATENT DOCUMENTS

| 3,388,761 | A | * | 6/1968 | Arpin | 180/208 |
| 5,150,762 | A | * | 9/1992 | Stegeman et al. | 180/208 |
| 5,154,251 | A | * | 10/1992 | Fought | 180/208 |
| 6,699,616 | B2 | * | 3/2004 | Wu | 429/98 |
| 7,028,799 | B2 | * | 4/2006 | Lin | 180/208 |
| 7,044,249 | B2 | * | 5/2006 | Fan | 180/208 |
| 7,059,441 | B2 | * | 6/2006 | Chen | 180/208 |
| 7,159,681 | B1 | * | 1/2007 | Sauve | 180/208 |
| 7,165,642 | B1 | * | 1/2007 | Chen | 180/208 |
| 2006/0086553 | A1 | * | 4/2006 | Chen | 180/208 |
| 2006/0283645 | A1 | * | 12/2006 | Lin et al. | 180/208 |

* cited by examiner

*Primary Examiner*—Paul N. Dickson
*Assistant Examiner*—Toan C. To
(74) *Attorney, Agent, or Firm*—Allston L. Jones

(57) ABSTRACT

A modular type motor-driven vehicle includes a front half module, a rear half module and a retainer unit. The front half module includes a front vehicle frame, a front vehicle body shell disposed fixedly on the front vehicle frame, and a seat disposed fixedly on the front vehicle body shell. The rear half module includes a rear vehicle frame, a rear vehicle body shell disposed fixedly on the rear vehicle frame, and a driving unit disposed between the rear vehicle frame and the rear vehicle body shell. The retainer unit includes an engaging member connected fixedly to the front half module, a handle unit disposed on the rear half module, a hook member biased to engage the engaging member so as to retain the front half module on the rear half module. The handle unit is operable so as to disengage the hook member from the engaging member.

10 Claims, 9 Drawing Sheets

MODULAR TYPE MOTOR-DRIVEN VEHICLE

BACKGROUND OF THE INVENTION

1. Field of the Invention

This invention relates to a motor-driven vehicle, and more particularly to a modular type motor-driven vehicle.

2. Description of the Related Art

Referring to FIGS. 1 and 2, a conventional modular type motor-driven vehicle 1 includes a front vehicle frame 11 with a central rod 12, a rear vehicle frame 13 with a transverse rod 14, an engaging member 15 disposed fixedly on a rear end of the front vehicle frame 11, a U-shaped bracket 16 disposed fixedly on the engaging member 15, and a retainer unit 17 with a quick release latch 18 disposed on the rear vehicle frame 13 and extending through the U-shaped bracket 16 for locking the front vehicle frame 11 to the rear vehicle frame 13.

During assembly, the front and rear vehicle frames 11, 13 are initially oriented as shown in FIG. 2. Two inverted U-shaped lugs 111 of the front vehicle frame 11 are moved to engage respectively two projecting rods 13*l* of the rear vehicle frame 13. This results in engagement between the transverse rod 14 and the engaging member 15. Subsequently, the rear vehicle frame 13 is rotated about the transverse rod 14 in a counterclockwise direction so as to engage the quick release latch 18 within the U-shaped bracket 16. At this time, the quick release latch 18 can be operated to lock the front vehicle frame 11 on the rear vehicle frame 13, as shown in FIG. 1.

The conventional modular type motor-driven vehicle 1 suffers from the following disadvantages.

(1) A vehicle body shell 19 and wirings need to be removed from the front and rear vehicle frames 11, 13 prior to disassembly of the motor-driven vehicle 1. This results in a troublesome disassembly process.

(2) During assembly, it is difficult to rotate the rear vehicle frame 13 about the transverse rod 14.

SUMMARY OF THE INVENTION

The object of this invention is to provide a modular type motor-driven vehicle that can be assembled and disassembled easily and conveniently.

According to this invention, a modular type motor-driven vehicle includes a front half module, a rear half module and a retainer unit. The front half module includes a front vehicle frame, a front vehicle body shell disposed fixedly on the front vehicle frame, and a seat disposed fixedly on the front vehicle body shell. The rear half module includes a rear vehicle frame, a rear vehicle body shell disposed fixedly on the rear vehicle frame, and a driving unit disposed between the rear vehicle frame and the rear vehicle body shell. The retainer unit includes an engaging member connected fixedly to the front half module, a handle unit disposed on the rear half module, a hook member disposed on the rear vehicle frame and biased to engage the engaging member so as to retain the front half module on the rear half module. The handle unit is operable so as to disengage the hook member from the engaging member, thereby allowing for removal of the front half module from the rear half module. Thereafter, when the handle unit is released, the hook member is biased to engage the engaging member. As such, the modular type motor-driven vehicle can be assembled and disassembled easily and conveniently.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
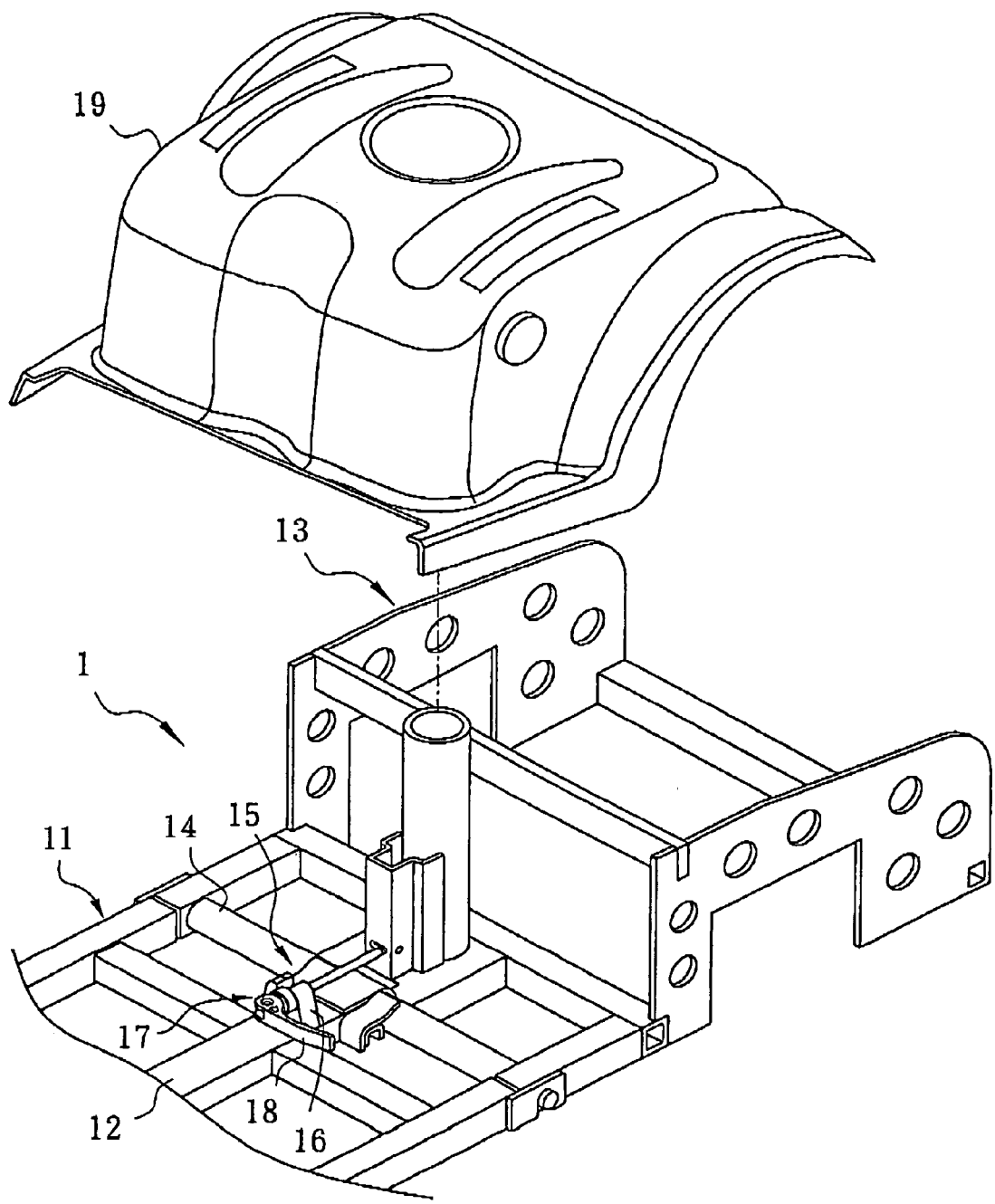
FIG. 1 is a partly exploded fragmentary perspective view of a conventional modular type motor-driven vehicle, a front vehicle frame being connected to a rear vehicle frame.
Figure 2:
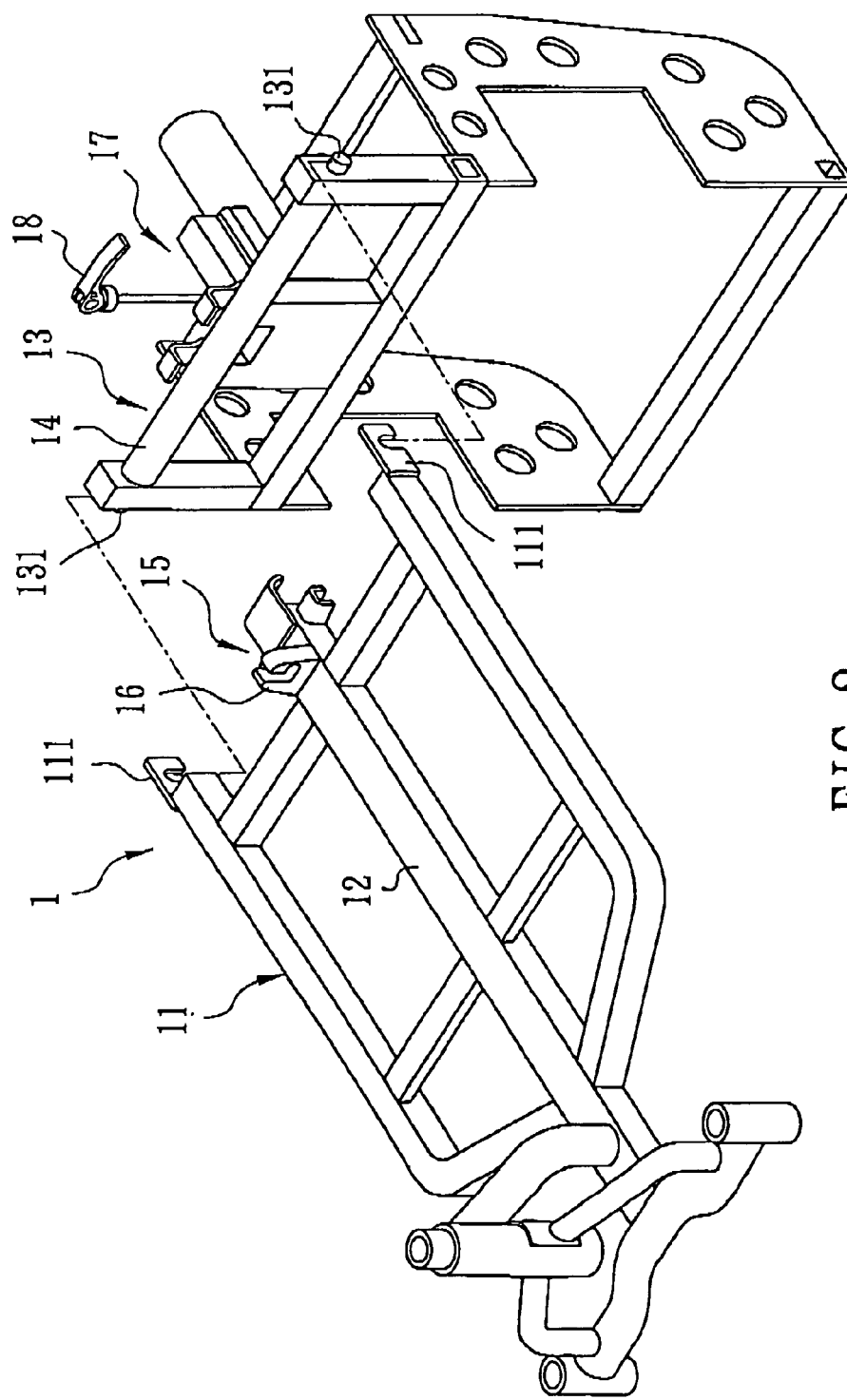
FIG. 2 is a partly exploded fragmentary perspective view of the conventional modular type motor-driven vehicle, the front vehicle frame being disconnected from the rear vehicle frame.
Figure 3:
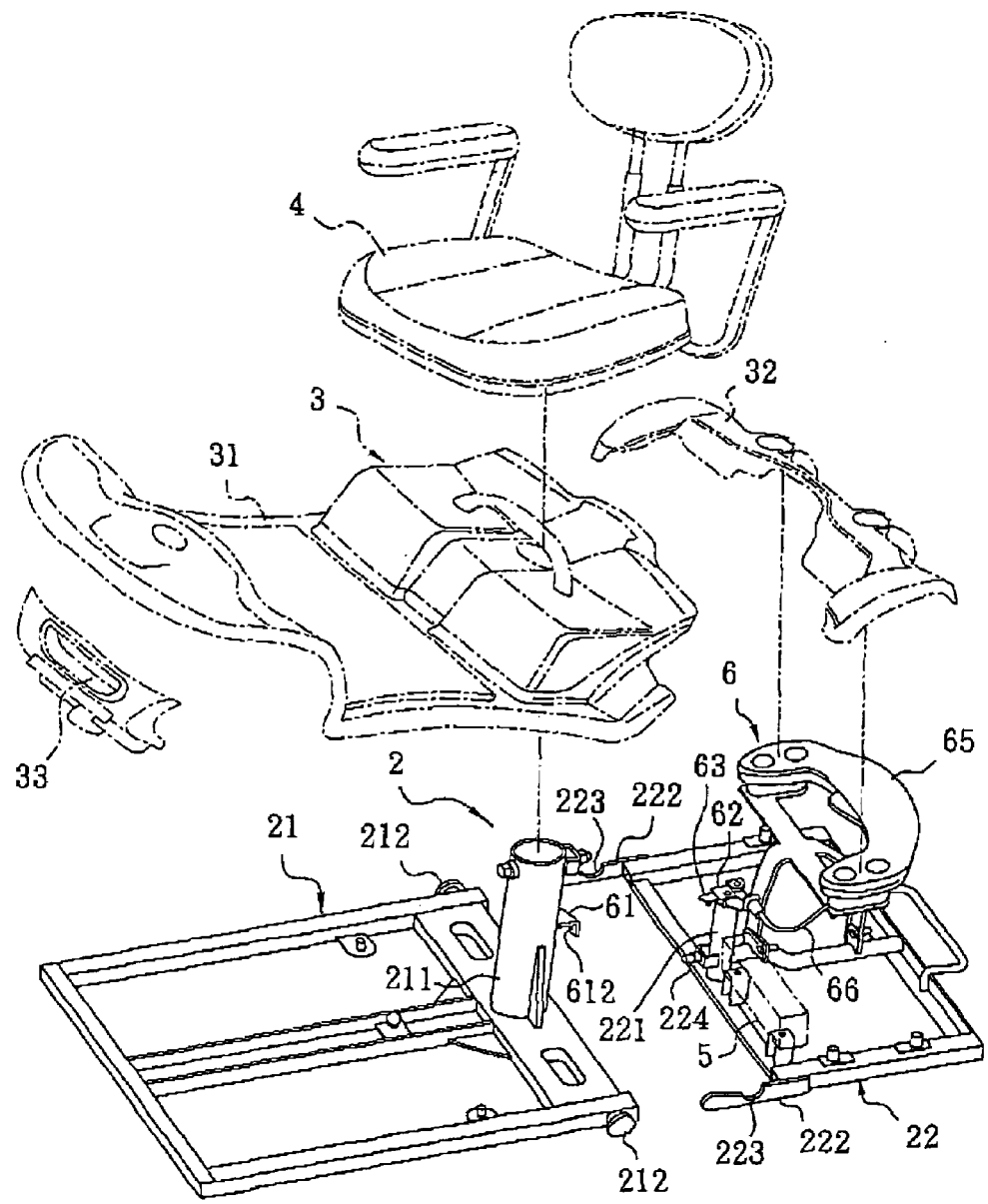
FIG. 3 is a partly exploded fragmentary perspective view of the preferred embodiment of a modular type motor-driven vehicle according to this invention.
Figure 4:
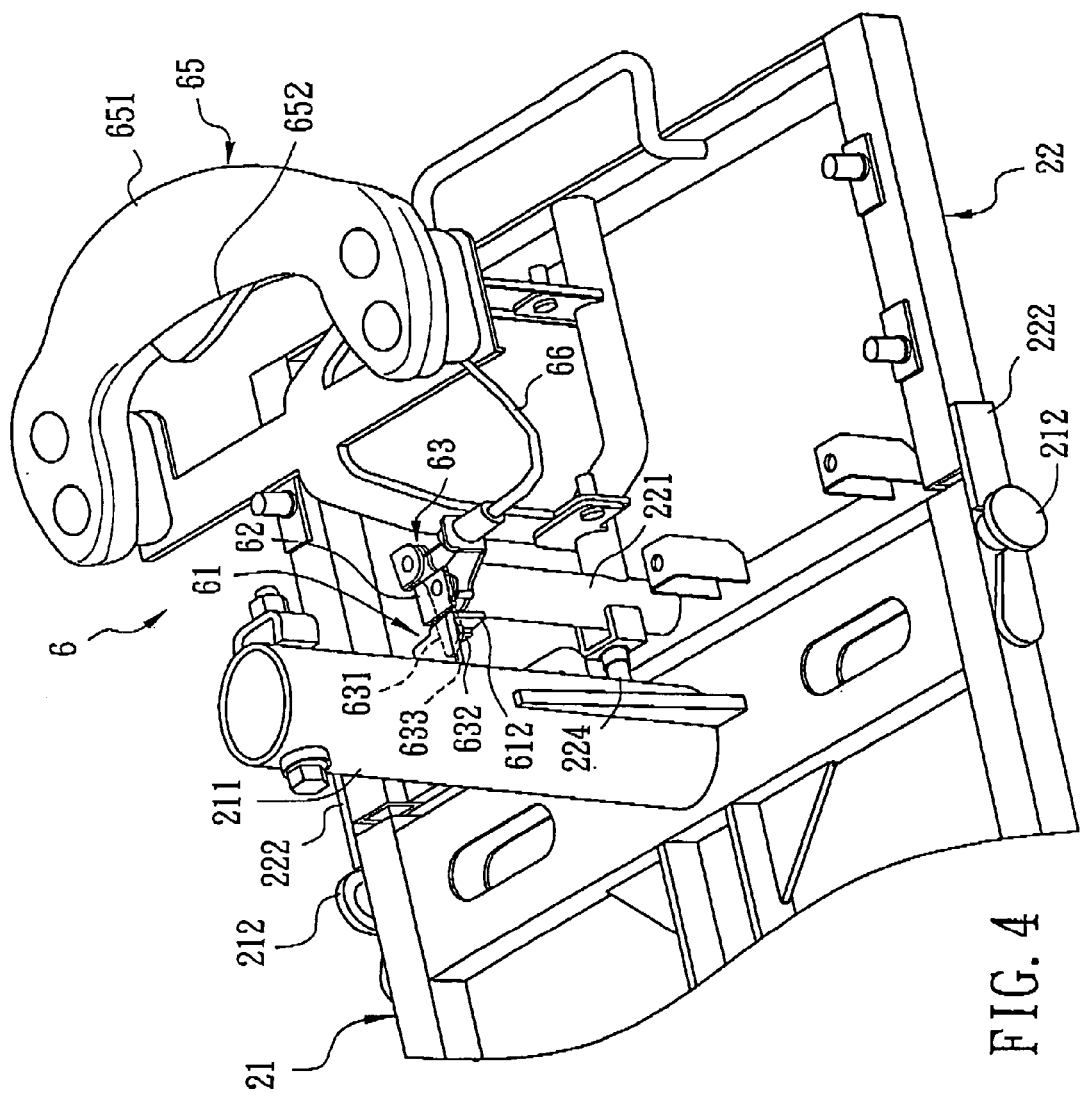
FIG. 4 is an assembled fragmentary perspective view of the preferred embodiment, illustrating how a front vehicle frame is retained on a rear vehicle frame by a retainer unit.
Figure 7:
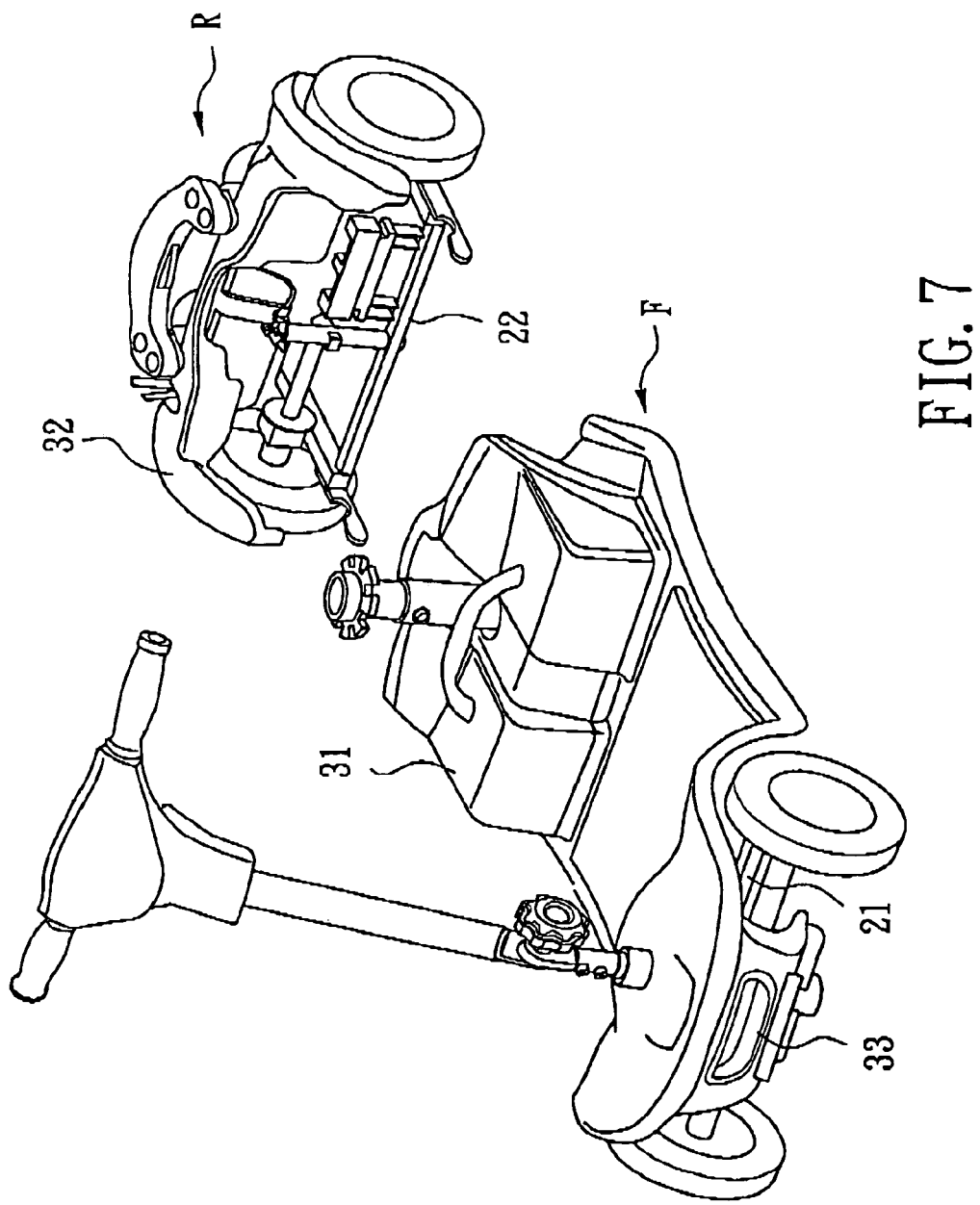
FIG. 7 is an exploded perspective view of front and rear half modules of the preferred embodiment, in which a seat is removed for better illustration.

Referring to FIGS. 3, 4 and 7, the preferred embodiment of a modular type motor-driven vehicle according to this invention includes a vehicle frame unit 2, a vehicle body shell unit 3, a seat 4, a driving unit 5, and a retainer unit 6. The vehicle frame unit 2 includes front and rear vehicle frames 21, 22. The vehicle body shell unit 3 includes a front vehicle body shell 31 covering and disposed fixedly on the front vehicle frame 21, and a rear vehicle body shell 32 covering and disposed fixedly on the rear vehicle frame 22. The front vehicle body shell 21 is formed with a fixed grip 33.

The front vehicle frame 21 includes a fixed front upright rod 21*l* that extends upwardly from a rear end thereof and through the front vehicle body shell 31 and that has an upper end, which supports the seat 4 thereon. The rear vehicle frame 22 includes a fixed rear upright rod 22*l* at a front end thereof. The front vehicle frame 21, the front vehicle body shell 31 and the seat 4 constitute cooperatively a front half module (F) (see FIG. 7). The driving unit 5 is disposed between the rear vehicle frame 22 and the rear vehicle body shell 32. The rear vehicle frame 22, the rear vehicle body shell 32 and the driving unit 5 constitute cooperatively a rear half module (R) (see FIG. 7).

A positioning unit includes two positioning projections 212 and two elongated vertical guiding strips 222. The guiding strips 222 extend respectively and forwardly from and are connected fixedly to left and right sides of the rear vehicle frame 22. Each of the guiding strips 222 has a top side that is formed with a notch 223. The positioning projections 212 extend respectively and outwardly from left and right sides of the front vehicle frame 21 away from each other and through the notches 223 in the guiding strips 222. With the positioning unit disposed between the front and rear half modules (F, R), the left and right sides of the front half module (F) are aligned respectively with those of the rear half module (R).

An adjustment bolt 224 is disposed rotatably on the rear upright rod 22*l*, and is adjustable to press against the front upright rod 21*l*.

Figure 4A:
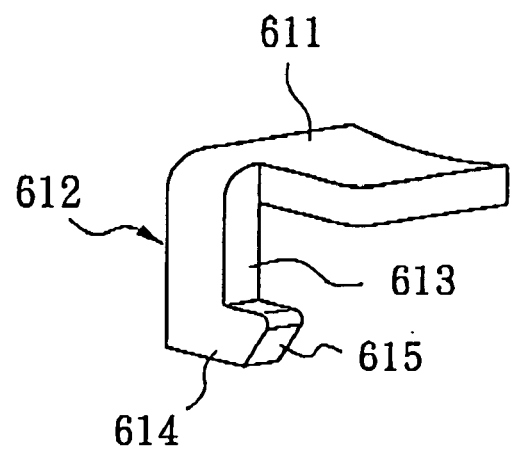
FIG. 4A is a perspective view of an engaging member of the preferred embodiment.
Figure 4B:
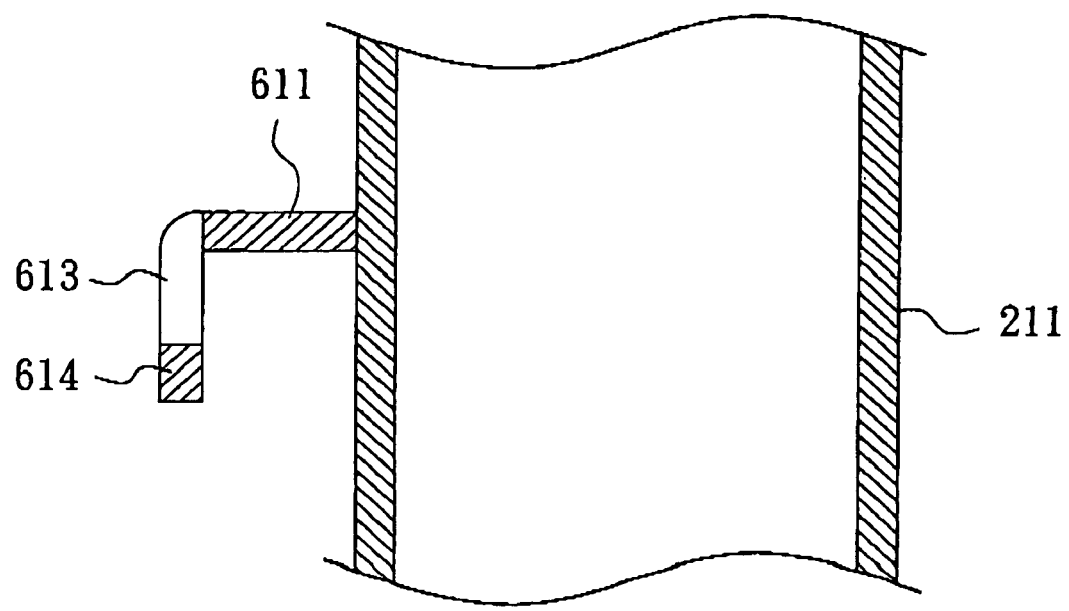
FIG. 4B is a fragmentary sectional view of the engaging member and a front upright rod of the preferred embodiment.
Figure 4C:
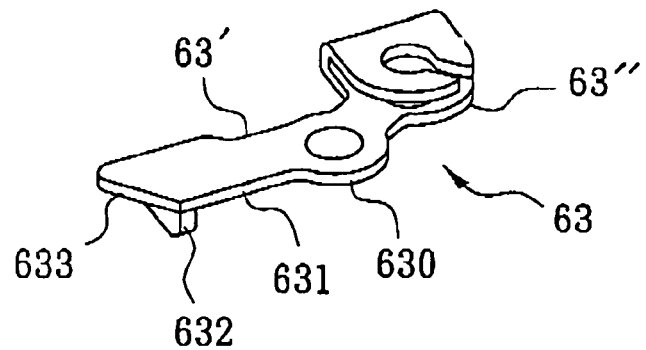
FIG. 4C is a perspective view of a hook member of the preferred embodiment.
Figure 4D:
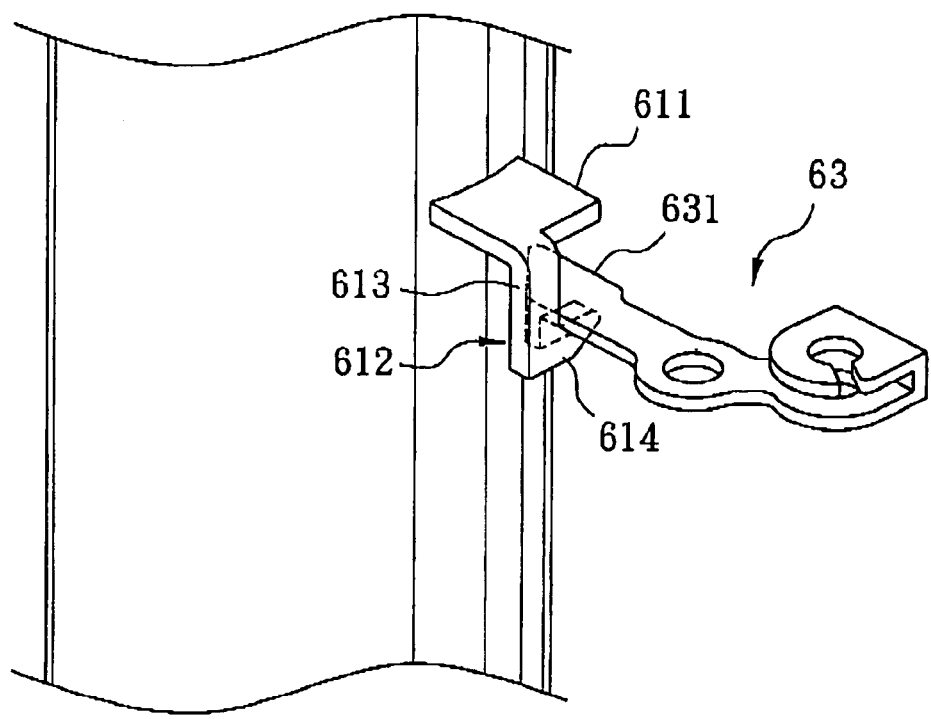
FIG. 4D is a fragmentary perspective view of the preferred embodiment, illustrating engagement of the hook member and the engaging member.

The retainer unit 6 includes an engaging member 61, a supporting plate 62, a hook member 63, a torsional spring 64 (see FIGS. 5 and 6), a handle unit 65 and a control cable 66. Referring to FIGS. 4A and 4B, the engaging member 61 includes a horizontal plate 611 connected fixedly to the front upright rod 21*l*, and an L-shaped rod 612. The L-shaped rod 612 has an upright rod portion 613 connected fixedly to the horizontal plate 611 at an upper end thereof, and a horizontal rod portion 614 extending integrally from a lower end of the upright rod portion 613. The horizontal rod portion 614 has an end surface that has an inclined guiding surface portion 615. The supporting plate 62 is connected fixedly to an upper end of the rear upright rod 221. Referring to FIGS. 3, 4, 4C, 4D, 5, 6 and 7, the hook member 63 has a first swing arm 63' (see FIG. 4C), a second swing arm 63" (see FIG. 4C), and a pivot portion 630 (see FIG. 4C) formed integrally with the first and second swing arms 63', 63" and connected pivotally to the supporting plate 62. The first swing arm 63' has an inclined plate portion 631 and an insert portion 632. The inclined plate portion 631 extends forwardly and downwardly from the pivot portion 630 into a space between the horizontal plate 611 and the horizontal rod portion 614 of the L-shaped rod 612, and has an inclined engaging side 633. The insert portion 632 extends integrally and downwardly from a lower end of the inclined plate portion 631, and is biased by the torsional spring 64 to extend into a limiting space between the horizontal rod portion 614 and the front upright rod 211. Therefore, rearward removal of the rear half module (R) from the front half module (F) can be prevented.

Figure 5:
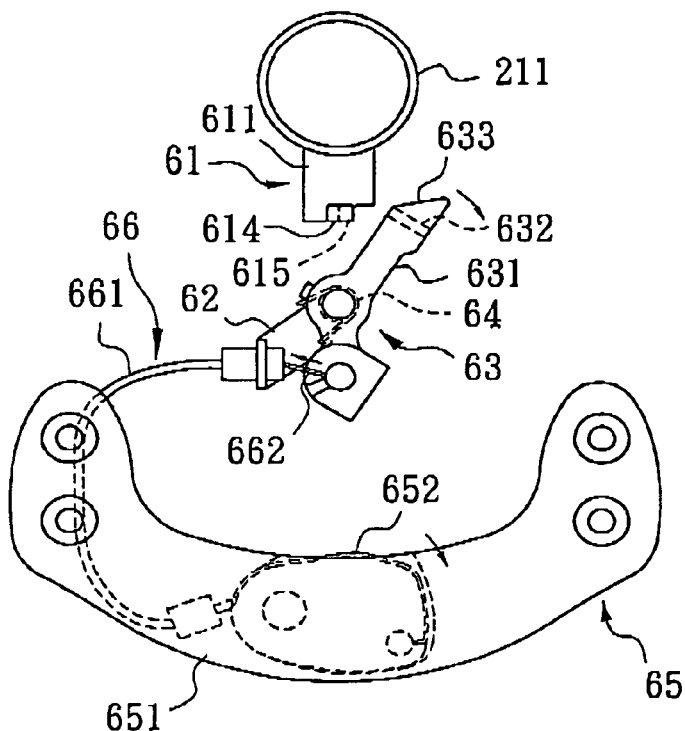
FIG. 5 is a schematic view of the retainer unit of the preferred embodiment, illustrating how the hook member is disengaged from the engaging member.
Figure 6:
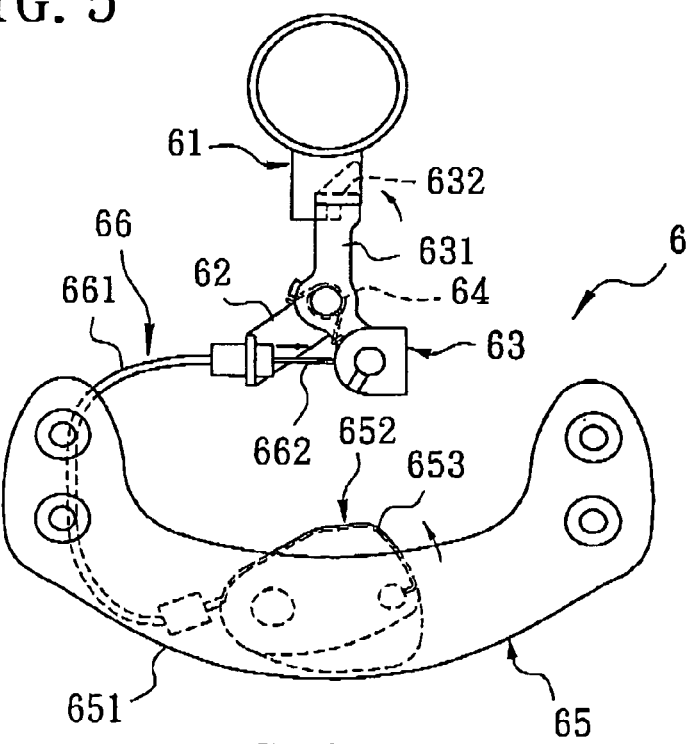
FIG. 6 is a schematic view of the retainer unit of the preferred embodiment, illustrating how the hook member is engaged with the engaging member.

The handle unit 65 includes a hollow handle body 651 disposed fixedly on the rear vehicle frame 22, and a controlling member 652 disposed swingably within the handle body 651. The control cable 66 includes a tubular outer cable portion 661 and an inner cable portion 662 extending through and disposed movably within the outer cable portion 661. The outer cable portion 661 has two ends that are fastened respectively to the supporting plate 62 and the handle body 651. The inner cable portion 662 has two ends that are fastened respectively to the second swing arm 62" of the hook member 63 and the controlling member 652. The controlling member 652 has an extended portion 653 (see FIG. 6) that is biased by the torsional spring 64 to project outwardly from the handle body 651, as shown in FIG. 6, when the hook member 63 engages the engaging member 61. The extended portion 653 of the controlling member 652 can be pressed so as to disengage the first swing arm 63' of the hook member 63 from the engaging member 61, as shown in FIG. 5. This allows for removal of the first and second half modules (F, R) from each other. At this time, when the extended portion 653 of the controlling member 652 is released, the hook member 63 is biased by the torsional spring 64 to engage the engaging member 61.

Figure 8A:
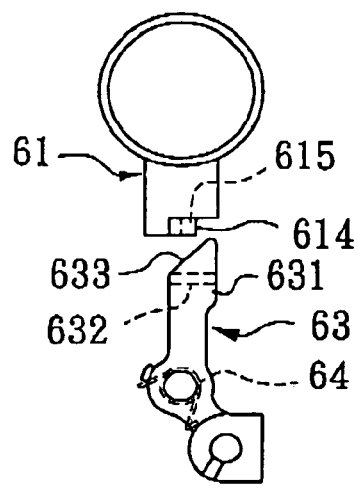
FIGS. 8A, 8B, and 8C illustrate how the hook member is guided to engage the engaging member.
Figure 8B:
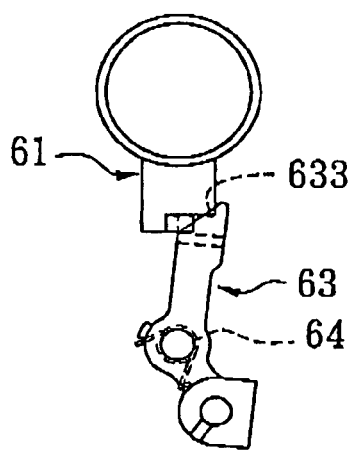

During assembly, the inclined engaging side 633 of the inclined plate portion 631 of the hook member 63 is biased by the torsional spring 64 to engage the inclined guiding surface portion 615 of the L-shaped rod 612 of the engaging member 61, as shown in FIG. 8B. Therefore, the insert portion 632 of the hook member 63 can be guided into the limiting space between the horizontal rod portion 614 and the front upright rod 21*l*.

The modular type motor-driven vehicle of this invention has the following advantages.

Figure 8C:
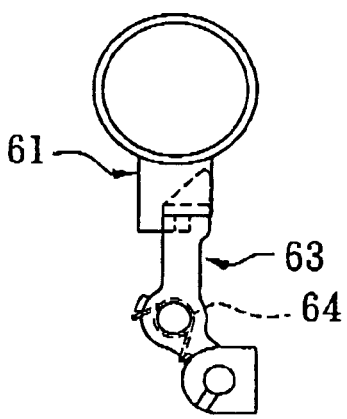

(1) When the positioning projections 212 of the front vehicle frame 21 are engaged within the notches 223 in the guiding strips 222 of the rear vehicle frame 22, the hook member 63 is biased to engage the engaging member 61. When the hook member 63 pivots from the position shown in FIG. 8A to that shown in FIG. 8B, the inclined engaging side 633 of the inclined plate portion 631 engages the inclined guiding surface portion 615 of the L-shaped rod 612. As such, the hook member 63 is guided by the inclined guiding surface portion 615 to the position shown in FIG. 8C so as to engage the engaging member 61. This simplifies the assembly process of the vehicle of this invention.

(2) After assembly, the adjustment bolt 224 can be adjusted so as to press the hook member 63 against the L-shaped rod 612. This results in a secure connection between the front and rear half modules (F, R).

(3) In order to disconnect the front and rear half modules (F, R) from each other, it is only necessary to press the controlling member 652. This simplifies the disassembly process of the vehicle of this invention.

(4) During assembly, the handle body 651 and the grip 33 can be held conveniently to move the front and rear half modules (F, R).

(5) There is no need for the rearrangement of wirings on the vehicle of this invention during assembly and disassembly. This results in quick assembly and disassembly of the vehicle.

With this invention thus explained, it is apparent that numerous modifications and variations can be made without departing from the scope and spirit of this invention. It is therefore intended that this invention be limited only as indicated by the appended claims.

We claim:

1. A modular type motor-driven vehicle comprising:
   a front vehicle frame having left and right sides;
   a rear vehicle frame having left and right sides;
   a positioning unit for aligning said left and right sides of said front vehicle frame respectively with said left and right sides of said rear vehicle frame;
   a front vehicle body shell covering and disposed fixedly on said front vehicle frame;
   a rear vehicle body shell covering and disposed fixedly on said rear vehicle frame;
   a seat disposed fixedly on said front vehicle body shell so that said front vehicle frame, said front vehicle body shell and said seat constitute cooperatively a front half module;
   a driving unit disposed between said rear vehicle frame and said rear vehicle body shell so that said rear vehicle frame, said rear vehicle body shell and said driving unit constitute cooperatively a rear half module; and
   a retainer unit including
      an engaging member connected fixedly to a rear end of said front half module, a hook member connected rotatably to said front end of said rear half module and biased to engage said engaging member so as to retain said front half module on said rear half module, and a handle unit disposed on said rear half module and operable so as to disengage said hook member from said engaging member, thereby allowing for removal of said front half module from said rear half module.

2. The modular type motor-driven vehicle as claimed in claim 1, wherein said front vehicle frame includes a fixed front upright rod that extends upwardly through said front vehicle body shell and that has an upper end which supports said seat thereon, and said rear vehicle frame includes a fixed rear upright rod, said engaging member being connected fixedly to said front upright rod, said hook member being connected rotatably to said rear upright rod.

3. The modular type motor-driven vehicle as claimed in is claim 2, further comprising an adjustment bolt that is disposed rotatably on said rear upright rod and that is adjustable to press against said front upright rod.

4. The modular type motor-driven vehicle as claimed in claim 1, wherein said hook member has a first swing arm, a second swing arm, and a pivot portion formed integrally with said first and second swing arms and connected pivotally to said rear half module, said retainer unit further including a torsional spring for biasing said first swing arm of said hook member to engage said engaging member, and a control cable having two ends that are fastened respectively to said second swing arm of said hook member and said handle unit.

5. The modular type motor-driven vehicle as claimed in claim 4, wherein said handle unit includes a hollow handle body disposed fixedly on said rear vehicle frame, and a controlling member disposed swingably within said handle body and having an extended portion that is biased by said torsional spring to project outwardly from said handle body and that is pressable so as to disengage said first swing arm of said hook member from said engaging member.

6. The modular type motor-driven vehicle as claimed in claim 5, wherein said control cable includes a tubular outer cable portion and an inner cable portion extending through and disposed movably within said outer cable portion, said outer cable portion having two ends that are fastened respectively to said rear upright rod and said handle body, said inner cable portion having two ends that are fastened respectively to said second swing arm of said hook member and said controlling member.

7. The modular type motor-driven vehicle as claimed in claim 4, wherein said front vehicle frame includes a fixed front upright rod that extends upwardly through said front vehicle body shell and that has an upper end which supports said seat thereon, and said rear vehicle frame includes a fixed rear upright rod, said engaging member including a horizontal plate connected fixedly to said front upright rod, and an L-shaped rod, said L-shaped rod having an upright rod portion connected fixedly to said horizontal plate at an upper end thereof, and a horizontal rod portion extending integrally from a lower end of said upright rod portion, said first swing arm of said hook member having an inclined plate portion that extends forwardly and downwardly from said pivot portion into a space between said horizontal plate and said horizontal rod portion of said L-shaped rod, and an insert portion that extends integrally and downwardly from a lower end of said inclined plate portion and that is biased to extend into a limiting space between said horizontal rod portion of said engaging member and said front upright rod so as to prevent rearward removal of said rear half module from said front half module.

8. The modular type motor-driven vehicle as claimed in claim 7, wherein said horizontal rod portion of said L-shaped rod of said engaging member has an end surface that has an inclined guiding surface portion, said inclined plate portion of said hook member having an inclined engaging side that is biased to engage said inclined guiding surface portion of said horizontal rod portion so that said inclined guiding surface portion guides said insert portion of said hook member into said limiting space during assembly.

9. The modular type motor-driven vehicle as claimed in claim 1, wherein said positioning unit includes:

two elongated vertical guiding strips extending respectively and forwardly from and connected fixedly to said left and right sides of said rear vehicle frame, each of said guiding strips having a top side that is formed with a notch; and two positioning projections extending respectively and outwardly from said left and right sides of said front vehicle frame away from each other and through said notches in said guiding strips.

10. The modular type motor-driven vehicle as claimed in claim 1, wherein said front vehicle body shell is formed with a fixed grip.

* * * * *